United States Patent Office 3,199,820
Patented Aug. 10, 1965

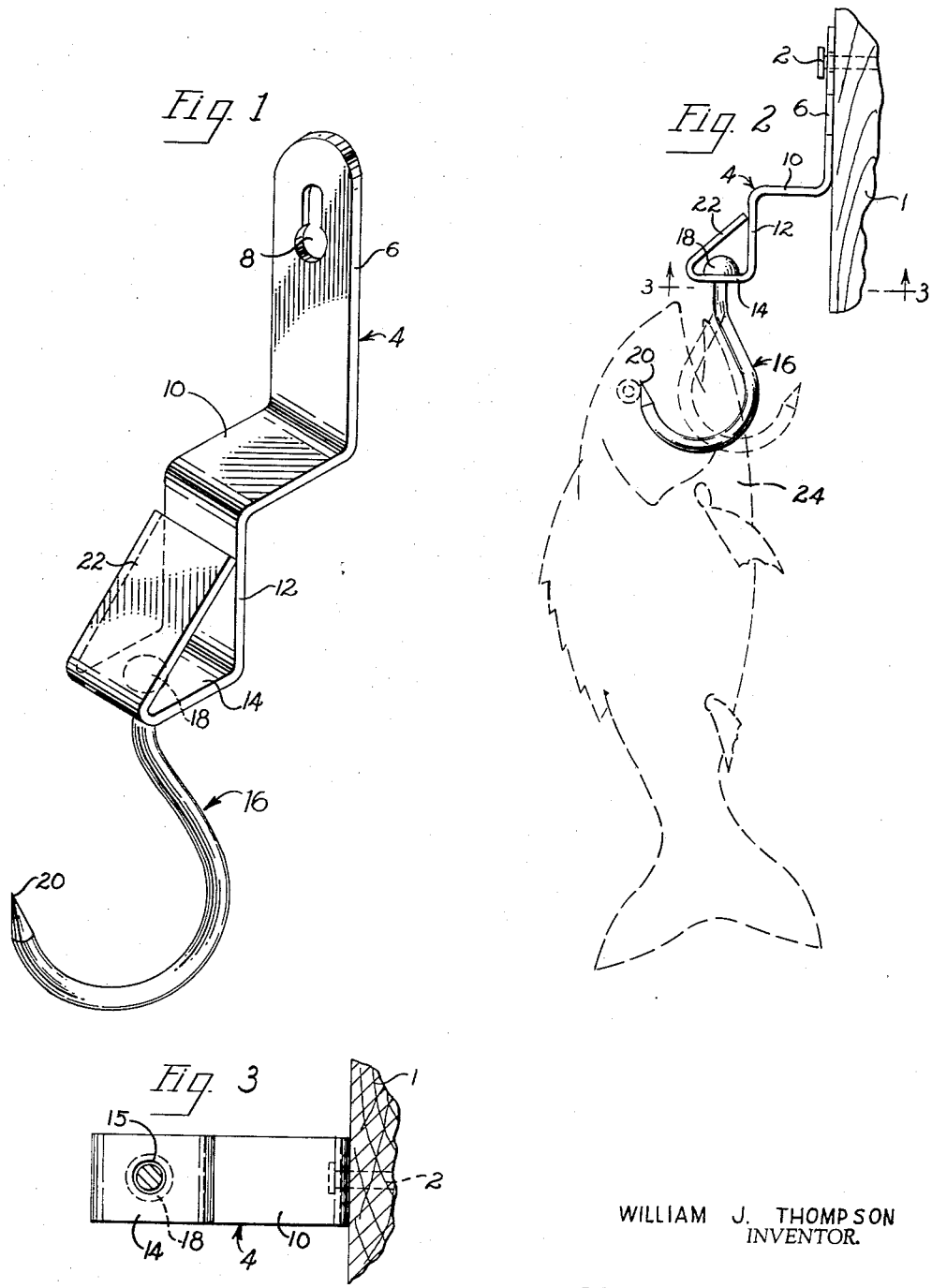

3,199,820
SUPPORT HANGER FOR FISH, GAME AND THE LIKE
William J. Thompson, 1414 8th St., Wichita Falls, Tex.
Filed Oct. 29, 1963, Ser. No. 319,740
1 Claim. (Cl. 248—224)

This invention relates to improvements in hangers and more particularly to hangers for hanging fish preparatory to dressing the fish.

Heretofore, the dressing of fish has presented a difficult, messy job, which required the fish be held in such manner that complete access might be had thereto without the fish slipping through the hands of the person dressing the fish. Furthermore, there was always the possibility of a knife slipping, resulting in injury to the person dressing the fish.

The present invention constitutes a hanger which is readily attachable to a stable support and which is so arranged as to readily enable the attachment of a fish thereto in such manner that the fish may be rotated about a vertical axis, to make possible cutting open, skinning or otherwise cleaning the fish.

The present invention utilizes a bracket which may be readily attached to a wall, as by a nail or the like, or it may be hung from a higher elevation, as by a wire or other means, to enable a pivotally mounted hook on the lower side thereof to be readily engaged in a portion of the fish, such as the head, to enable the fish to be easily cleaned.

An object of this invention is to provide a hanger or the like for hanging fish or other hard to hold game, whereby it is necessary to engage a carcass to prevent the fish or other game slipping while it is being properly dressed.

Another object of the invention is to provide a hanger hook for use in dressing fish, game or the like, which hanger may be readily attached to or removed from a wall or other anchorage.

Still another object of the invention is to provide a hanger hook arrangement which is off-set with respect to a vertical plane surface, so as to enable the hook to freely pivot about a vertical axis, without the hook, with the fish or game attached thereto, engaging the wall or other vertical plane surface.

A further object of the invention is to provide a pointed hook mounted in a bracket in such manner that the hook may freely rotate with respect to the bracket and whereby the hook is retained within the bracket.

Still another object is to provide a hanger hook for dressing fish, or the like, which is simple in construction, low in the cost of manufacture, which is comparatively small in size and which is easy to use.

With these objects in mind and others which will become manifest as the description proceeds, reference is to be had to the accompanying drawing in which like reference characters designate like parts in the several views thereof, in which:

FIG. 1 is a perspective view taken from the front, and side, looking down on the device, to bring out the details of construction;

FIG. 2 is a fragmentary, elevational view of an upright support member, such as a wall, and showing a side elevational view of the hanger hook attached thereto, with a fish, shown in dashed outline, engaged thereon; and FIG. 3 is a sectional view taken on the line 3—3 of FIG. 2, looking in the direction indicated by the arrows.

With more detailed reference to the drawing, the numeral 1 designates an upright support standard, such as a post, wall or the like, in which a nail 2 is shown to be driven. A bracket, designated generally by the numeral 4, has an upright stem portion 6, in which stem portion of the bracket 4 an inverted keyhole slot 8 is formed. The stem portion 6 extends downward and is bent outward, as indicated at 10 to give clearance between the upright support member and a second upright portion 12 of the bracket. A portion 14 extends from the lower end of the upright portion 12 and is apertured to receive a hook, designated generally by the numeral 16, one end of which hook has a headed portion 18, which is adapted to seat upon the upper face of outwardly extending portion 14.

The hook 16 is curved downwardly and outwardly, and has a pointed portion 20 for engagement with the fish or other game into which the hook is to be engaged. After the hook is passed through aperture 15 in the portion 14 of the hanger, an upstanding portion 22, which is on the outer end of outstanding portion 14, is bent toward the portion 12 until it engages with the upstanding portion 12, thereby retaining the hook 16 in position. The hook 16 pivots about a vertical axis when the bracket 4 is attached to a support, such as a wall or the like, as shown in FIG. 2, which enables a fish 24, or the like, to be engaged with the hook 16 in such manner that the fish or the like, may be rotated about the axis of the hook to enable thorough cleaning of the fish, or the like with a minimum of effort, and enables the fish, or other game, to be turned to any desired position.

The arrangement as described herein enable fish, game and the like to be readily dressed, skinned, or otherwise processed.

While the invention has been shown and described in one embodiment thereof, it is to be understood that changes may be made in the minor details of construction and adaptations made to different installations without departing from the spirit of the invention or the scope of the appended claim.

Having thus clearly shown and described the invention, what is claimed as new and desired to be secured by Letters Patent is:

In a hanger for use on a support member, an apertured bracket, an outwardly extending portion on said bracket, said bracket having a second outwardly extending portion, which portion is apertured, an upright portion extending between said outstanding portions, a headed hook mounted within said aperture in said second outwardly extending portion of said bracket and being supported thereby for rotation of said hook about a vertical axis, and a reentrant portion on the distal end of said second outwardly extending portion, which reentrant portion extends over the upper end of said headed hook to restrain upward movement of said hook beyond a predetermined point.

References Cited by the Examiner

UNITED STATES PATENTS

| | | | |
|---|---|---|---|
| 70,884 | 11/67 | Oatley | 248—340 |
| 177,471 | 5/76 | Clark | 248—224 |
| 911,508 | 2/09 | Look | 248—304 X |
| 1,835,037 | 12/31 | Gillum | 248—224 X |
| 2,262,282 | 11/41 | Helgason | 248—211 |
| 2,628,050 | 2/53 | Hardwick | 248—224 |

CLAUDE A. LE ROY, *Primary Examiner.*